United States Patent [19]

Swales et al.

[11] 4,291,000

[45] Sep. 22, 1981

[54] PROCESS FOR THE PRODUCTION OF CHROMIUM TRIOXIDE

[75] Inventors: Danvers A. Swales; Michael A. Marshall, both of Darlington, England

[73] Assignee: British Chrome & Chemicals Limited, Cleveland, England

[21] Appl. No.: 120,432

[22] Filed: Feb. 11, 1980

[30] Foreign Application Priority Data

Feb. 17, 1979 [GB] United Kingdom ............... 05656/79

[51] Int. Cl.$^3$ ............................................. C01G 37/033
[52] U.S. Cl. ........................................ 423/53; 423/607
[58] Field of Search .................................. 423/53, 607

[56] References Cited

U.S. PATENT DOCUMENTS

| 322,011 | 7/1885 | Rowell | 423/607 |
| 1,429,912 | 9/1922 | D'Adrian | 423/607 |
| 2,034,256 | 3/1936 | Vitter | 423/607 |
| 2,632,688 | 3/1953 | Perrin | 423/607 |
| 3,002,815 | 10/1961 | Heizc | 423/607 |
| 3,592,609 | 7/1971 | Honbo | 423/607 |
| 3,607,026 | 9/1971 | Perrin et al. | 423/607 |

FOREIGN PATENT DOCUMENTS

| 338938 | 12/1930 | United Kingdom | 423/607 |
| 724246 | 2/1955 | United Kingdom | 423/607 |
| 793973 | 4/1958 | United Kingdom | 423/607 |
| 875111 | 8/1961 | United Kingdom | 423/607 |

Primary Examiner—Herbert T. Carter
Attorney, Agent, or Firm—Lawrence Rosen

[57] ABSTRACT

Chromium trioxide contaminated with sulphate is purified by washing with an aqueous purifying wash liquor, generally water or aqueous chromic acid, while at a temperature above 50° C. and centrifuging the washed product. Washing is generally conducted on the centrifuge. The chromium trioxide is preferably made by reacting sodium dichromate with from 2.4 to 2.8 mols sulphuric acid. The process can be operated to produce a novel product consisting of crystalline, non-fused, chromium trioxide that is substantially pure. The novel product can be in the form of pellets.

10 Claims, No Drawings

PROCESS FOR THE PRODUCTION OF CHROMIUM TRIOXIDE

Chromium trioxide ($CrO_3$) can, in theory, be made by various methods. For instance in British Patent Specification No. 961,200 an electrolytic method is described for producing $CrO_3$ from sodium chromate or dichromate, although we do not believe this method has been used on a commercial scale. This method is said to result in the production of chromium trioxide contaminated with $Na_2CrO_4$ and/or $Na_2Cr_2O_7$, and a process of making higher purity products is described involving centrifuging and washing. Sulphate will not be a major impurity in this process and instead will be present in the starting materials and end products, before and after washing, in only very small quantities.

On an industrial scale chromium trioxide is generally made by reacting an alkali metal dichromate, normally sodium dichromate, with sulphuric acid according to the following equation:

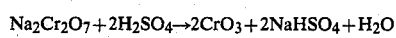

$$Na_2Cr_2O_7 + 2H_2SO_4 \rightarrow 2CrO_3 + 2NaHSO_4 + H_2O$$

This process may be carried out in a substantially anhydrous, molten, reaction mixture, for instance as described in British Patent Specification No. 338,938, and this process can give an adequately pure product. However many manufacturers prefer to use aqueous sodium dichromate and to conduct the reaction as an aqueous process.

In the aqueous process a concentrated sodium dichromate solution is mixed with an amount of sulphuric acid that is generally at least the stoichiometric amount. The reaction is strongly exothermic and the precipitated chromium trioxide crystals have to be recovered from the warm slurry by a filtration process. The crystalline product is impure in that it contains, in addition to chromium trioxide, appreciable amounts of sodium bisulphate, water, and often sulphuric acid as well. Indeed in some of the processes described in the prior art a considerable excess of sulphuric acid is used. However, for most industrial uses the chromium trioxide needs to be fairly pure, e.g. at least 95% $CrO_3$ and often greater than 99% $CrO_3$.

The percentages throughout this specification are by weight based on the total solid product, unless otherwise stated.

Many processes for purifying the crystalline product obtained from the aqueous process have been described. In practice all methods for making high purity product on a large scale involve the step of fusing the crystalline product and thereby separating the impurities while fused. This naturally is a very inconvenient and potentially dangerous and costly process to operate and has some particular disadvantages. It is especially dangerous when large amounts of sulphuric acid are used, and yet optimum separation only occurs if there is an excess of acid. Accordingly the molar ratio has to be selected carefully, and there is still potential danger. The purification may merely involve fusion of the filtered product followed by separation of pure $CrO_3$ from the upper layer or may involve treatment of the product prior to fusion.

For instance in British Patent Specification No. 724,246 the product that has been filtered is washed with a saturated alkali metal dichromate solution. The filtering may be carried out by a centrifuge which, according to the drawing, yields a product which after washing contains 94.3% $CrO_3$ and 3.3% sodium bisulphate. The use of alkali metal dichromate inevitably introduces sodium containing impurity. According to British Specification No. 739,760 the filtered product, for instance containing 7.4% sodium bisulphate and 7.8% water and 3.0% sulphuric acid, is reacted with sodium dichromate before the fusion. In British Patent Specification No. 793,973 the filtered product, e.g. that has been separated from the mother liquor of the reaction by centrifuging at between 50° and 65° C., has sodium dichromate added to it and the resultant product is used without further purification for metal plating. British Patent Specification No. 838,715 describes various known treatments for preparing crystalline product for fusion, including dissolving the product in water and reprecipitating by the addition of sulphuric acid, but describes in particular a method in which the product is separated from the mother liquor in which it is produced by filtration, e.g. centrifuging, analysed and then the appropriate amount of anhydrous alkali metal sulphate is added to react with free sulphuric acid to form alkali metal bisulphate prior to purification by fusion. In British Patent Specification 875,111 particular reaction conditions are observed such that a product containing about 80% chromium trioxide is obtainable which can be purified by melting and phase separation without any preliminary treatment such as washing.

Accordingly the present state of the art is that when chromium trioxide is made by the aqueous process it is therefore initially contaminated by sodium bisulphate, and that whenever a reasonably pure product i.e. with a $CrO_3$ content above 95%, is to be made the purification always involves a potentially dangerous fusion step for removal of a substantial proportion of the sodium bisulphate and other impurity. The requirement to purify by fusion severely restricts the proportions of the reactants that can be used. This is true despite extensive discussion in the literature of partial purification by, for instance, centrifuging, washing, recrystallising and various chemical purification methods since none of these methods have ever given sufficient purification to eliminate the conventional fusion method.

It has been our object to devise a method of purifying a crystalline product of chromium trioxide contaminated by alkali metal bisulphate and which can give a sufficiently high purity without a fusion step.

We have now discovered that a purified product containing at least 95% $CrO_3$ and less than 3% total sulphate, expressed as sodium bisulphate, can be made from a crude crystalline product containing less than 94% $CrO_3$ and more than 4% sulphate expressed at $NaHSO_4$ by washing the crude product with an aqueous purifying wash liquor and centrifuging the product while the product and the liquor are at a temperature of at least 50° C.

Since the solubility in water of sodium bisulphate is generally accepted as being less than that of chromium trioxide it might have been supposed that washing crude chromium trioxide crystals with an aqueous liquor would preferentially dissolve chromium trioxide so that the washed product would contain an increased proportion of sulphate, including bisulphate, contaminant than the starting material. However, it has surprisingly been found that provided the process is conducted at above 50° C. it is easily possible to obtain a reduced proportion of total sulphate, and thus to obtain a purer product.

The crude product is generally obtained by reacting concentrated aqueous sodium dichromate with sulphuric acid and filtering the resultant crystalline crude product from the warm reaction liquor and this product can be purified in the invention while still warm or it can be cooled and subsequently heated.

We have surprisingly found that in such a product the sulphate is present mainly on the surface of the $CrO_3$ crystals and so the process is applicable to the purification of any crystalline $CrO_3$ product having the crystal surfaces contaminated with sulphate. We have also surprisingly found that, provided the temperature is above 50° C., the bisulphate on the crystal surfaces is present in solution during the process. We have also surprisingly found that the solubility of sodium bisulphate is not seriously reduced by the presence of dissolved $CrO_3$, so that the sulphate impurity can be readily washed off even in the presence of concentrated chromic acid, but that the solubility of chromium trioxide appears to be reduced significantly by the presence of dissolved sulphate, so that very high yields of purified chromium trioxide can readily be obtained.

Any aqueous liquor that improves the purity of the crude product may be used. Since the process need not, and preferably does not, involve chemical reaction the liquor should not introduce components that are not already in the crystalline product, as these could contribute to additional impurities. Preferably therefore the wash liquor consists solely of water or an aqueous solution of chromic acid. It is particularly preferred to use chromic acid solutions, especially such solutions that are substantially saturated, e.g. containing at least 40 grams and preferably 50 to 65 grams $CrO_3$ in 100 grams solution. The wash liquor is preferably free of alkali metal dichromate as this would introduce fresh impurity, although this may sometimes be tolerable in small amounts. The wash liquor can be contaminated by sulphate but the amount in fresh wash liquor (before contact with the crude product) should always be low (e.g. below 30%, and preferably below 20%, especially below 10%, expressed as $NaHSO_4$) since washing with a high sulphate liquor would not reduce the sulphate content of the crude product. Preferably the fresh liquor is substantially free of sulphate. The reaction liquor in which the crude product is first made by reaction between sulphuric acid and dichromate is not suitable.

When the wash liquor is a chromic acid solution it can be made by dissolving previously purified product or, surprisingly, crude product (i.e. before purification) and which may contain, for instance 4 to 15% sulphate, expressed as $NaHSO_4$, the wash liquor then containing for instance 2.5 to 11% sulphate expressed as $NaHSO_4$. The process can be conducted in two (or more) stages with the used wash liquor from the final stage being used as the fresh liquor for the first stage and with freshly made liquor (or substantially pure water) being used for the final stage. In this way the amount of washed product required to prepare a fresh supply of wash liquor can be substantially reduced and the net yield of washed product thereby maximised.

The amount of wash liquor to be used depends upon, for instance, the degree of purification that is to be obtained and the nature of the wash liquor. It is usually below 100%, preferably below 70%, by weight of crude product. Often if the liquor is water or a dilute solution of chromic acid, generally containing less than 20% chromic acid (20 grams chromium trioxide in 100 grams solution) the amount of wash liquor should be 5 to 20%, preferably below 15%, of the weight of the crude product as otherwise there may be unacceptable losses of chromium trioxide. However when more concentrated chromic acid solution is used as the wash liquor, and especially when a substantially saturated chromic acid solution is used, then the amount of wash liquor may be 20 to 70% by weight of the crude product although it is generally below 50%, for instance 40 to 50%, by weight. The used wash liquor is generally substantially saturated in chromic acid, the saturation value being controlled by the amount of sulphate in solution.

The washing may be conducted at least in part before centrifuging or all the washing may be conducted during centrifuging. The centrifuging is generally conducted under conditions such that the centrifuged product also contains less than 3% water and most preferably less than 2% water.

At all times during the washing and centrifuging the crystalline product and the wash liquor should be maintained above 50° C., generally between 60° and 100° C. and preferably 65° to 80° C. Preferably the crystalline product will have been maintained at a temperature of at least 50° C. since its initial manufacuture from sodium dichromate and sulphuric acid. Alternatively it may have been cooled and reheated prior to washing to a temperature above 50° C.

If part at least of the washing is conducted before centrifuging some or all of the wash liquor may be contacted with the crude product so as to reslurry crystals previously separated from the reaction liquor in which they were formed. Such a method may comprise separating impure chromium trioxide from a reaction mixture of sulphuric acid and sodium dichromate solution by any suitable separation process, for example on a rotary vacuum filter or centrifuge, followed by reslurrying the impure product with a small amount of wash liquor and subsequently centrifuging the slurry. The impure crystalline product may typically have a sulphate content (expressed as $NaHSO_4$) of 4 to 15% if it is separated on a centrifuge and up to 30% if it is separated on a vacuum filter. Addition of extra wash liquor during centrifuging is not normally required. However, if it is desired to increase the purity of the product the crystals may be further washed on the centrifuge with additional wash liquor.

Preferably however some, and often all, the washing is conducted during centrifuging, by adding the wash liquor gradually to the crystalline product while it is being centrifuged. The crude product that is to be centrifuged and washed is generally introduced into the centrifuge as a slurry and separated from the mother liquor of the slurry by centrifugation down to a sulphate content (expressed as $NaHSO_4$) of 4 to 15%, preferably 4 to 12%. The slurry is preferably the slurry obtainable by reacting aqueous sodium dichromate with sulphuric acid but alternatively the slurry may be formed by reslurrying in any appropriate liquor a crude crystalline product that has previously been isolated from the reaction mixture by any conventional solid/liquid separation technique, e.g. vacuum filtration. As mentioned above the liquor used for reslurrying the crystalline product may itself be a wash liquor.

In a preferred process, sulphuric acid and concentrated aqueous sodium dichromate are reacted together, e.g. in conventional manner, to produce a warm slurry containing crude chromium trioxide crystals, this slurry is centrifuged to separat the crude crystalline product from the reaction liquor, and the crude product is washed on the centrifuge with an aqueous purifying wash liquor at a temperature above 50° C.

Although some washing can be conducted simultaneously with the initial centrifuging of the crystals from the mother liquors it is preferred to remove most of the mother liquors by centrifuging, for example down to a water content of 2 to 5%, before starting to apply warm wash liquor on to the crystalline product.

Whenever washing is conducted by introducing wash liquor during centrifuging it is necessary to distribute the wash liquor as evenly as possible over the crystalline product in the centrifuge, application preferably being by spraying. Preferably the liquor is sprayed into the centrifuge over a period of at least 15 seconds, although it is generally unnecessary to spray for longer than 2 minutes. The period is preferably from 30 to 90 seconds with best results generally being obtained with a spraying period of about 1 minute. After the desired amount of wash liquor has been sprayed into the centrifuge centrifuging is preferably continued for a further period in order to reduce the water content of the product in the centrifuge to below 3% and preferably below 2%, as low as 1.5% sometimes being optimum. This further centrifuging may be conducted for, for instance, 0.5 to 5 minutes, often 1 to 3 minutes and preferably about 2 minutes after the final addition of wash liquor.

The used wash liquor contains useful chromium and acid values, even when the starting wash liquor is water. Generally it is combined with the filtrate obtained upon separating the crude product and is used with that in conventional manner, for instance to acidify chromate containing liquors obtained during the manufacture of sodium dichromate from chromite ore.

The centrifuge is generally cylindrical and may operate on a batch basis. It may be provided with one or more spray pipes parallel to its axis but generally positioned close to its outer wall, e.g. at more than 70% of the radius of the centrifuge or within 5 to 10 cm of the centrifuge wall. Spray orifices may be distributed, normally along a straight line, uniformly spaced along the wash pipe, e.g. 0.5 cm to 2 cm apart. Each orifice may merely be a hole drilled through the pipe wall but the orifices and the spray pressure should be such that each spary has a narrow cone angle, e.g. 2° to 20° preferably 5° to 10°. The spray pipe or pipes may be reciprocated, preferably with an amplitude equal to the orifice separation, during spraying. Air turbulence within the centrifuge should be sufficiently low that it does not make the spray pattern too uneven.

The centrifuge wall may be formed of a cloth covered basket. The centrifuge may be of conventional design and dimensions, but in order to prevent corrosive attack at least those surfaces which are most exposed should be formed of corrosion resistant material, for example titanium although replaceable parts may be of stainless steel and the centrifuge basket may be lined with P.T.F.E. cloth.

Irrespective of the method of introducing the crystalline product into the centrifuge we have found that the best results are obtained when the centrifuge generates a centrifugal force of 300 to 1800 G at the periphery, generally about 500 to 1500 G.

The crude crystalline product always contains less than 94% chromium trioxide and more than 4% sulphate expressed as $NaHSO_4$ and often contains from 60 to 90% chromium trioxide and more than 6%, e.g. 7 to 30%, total sulphate expressed as sodium bisulphate. The purified product always contains more than 95% chromium trioxide and less than 3% sulphate as $NaHSO_4$, and usually less than 3% water, and generally contains more than 97%, and often more than 98%, $CrO_3$ and below 1% sulphate measured as $NaHSO_4$, on a wet basis. The purity can easily be as high as that obtained by the conventional fusion pruification process and may be, for instance, on a dry basis over 99.8% $CrO_3$ and less than 0.1%, e.g. down to 0.02% total sulphate expressed as $NaHSO_4$. However, the process also lends itself readily to the production of chromium trioxide of somewhat lower purity suitable for certain applications. For example, in the manufacture of some wood preservative compositions a lower strength chromium trioxide having a $CrO_3$ content as low as 95% is acceptable. Such a product can also be used in various metal finishing processes where the presence of small proportions of sodium bisulphate is not deleterious.

The yield of purified chromium trioxide based on crude product depends upon the amount of impurities in the initial product and the wash liquor and the amount of wash liquor used. When the wash liquor is a substantially saturated chromic acid solution the apparent yield can be more than 100%, because of precipitation of chromium trioxide from the wash liquor. This precipitation is promoted by the presence of sulphate in the wash liquor introduced as a result of the washing. When the purified product is to have a total sulphate content of from 0.1 to 1%, expressed as sodium bisulphate, the amount of substantially saturated chromic acid solution is preferably 15 to 50% by weight of the crude product.

When the wash liquor is water or dilute chromic acid solution the yield may be lower, for instance 70 to 95% but the used wash liquors can be recycled and the chromium values recovered, as described above. The amount of such wash liquors may be 5 to 20% by weight of the crude crystals and these can easily give sulphate contents in the washed product of between 0.2 and 3%.

The proportions of sulphuric acid, sodium dichromate and water in the reaction mixture which is generally used as the source of crude product to be purified may be varied within fairly wide limits but the yield of pure product based on starting dichromate can be significantly increased if the ratio of acid: dichromate in the reaction mixture is increased above the conventional value of about 2.2 up to a value of from 2.3 to 3.0 (on a molar basis) and the product is then purified by the process of the invention. This increase in yield can be obtained without any undesirable increase in acid values per unit of purified product. Best results are obtained with molar ratios of 2.4 to 2.8, preferably about 2.6 with for instance an increase of more than 10% in yield of precipitated $CrO_3$, e.g. from 68% to more than 80% obtainable by increasing the molar ratio from 2.2 to 2.6. To further ensure a good recovery of solid chromium trioxide it is normal to restrict the amount of water in the reaction mixture by using concentrated solutions of sulphuric acid and sodium dichromate. Thus it is preferred to use solutions containing 70 to 85% by weight of sodium dichromate dihydrate in conjunction with 95 to 98% sulphuric acid although concentrations outside these ranges may be used if required.

The purified crystals resulting from the centrifuging may be stored or used with or without further treatment. If desired they may be dried in a conventional dryer. They may be agglomerated before this drying. The crystals from the centrifuge may have some tendency to cake on storage. It has been found, however, that this disadvantage can be minimised by pelleting or otherwise agglomerating the undried crystals, for example by granulation, extrusion or compaction. The pellets or granules obtained in this way have adequate mechanical strength and dissolve readily in water. Pelleting is best conducted on a mix having a moisture content of 3 to 7%, preferably 4 to 6% and so the preferred product of the invention containing less than 3% water preferably has water added to it after removal from the centrifuge and before pelleting. Addition of water may be by spraying. The pellets may then be further dried.

Crystalline chromium trioxide, both as free crystals and as pellets or other agglomerates, having the purities obtainable in the invention is a novel product, since chromium trioxide of such purities has always previously been in fused flake form generally as flakes.

The purified crystals may be fused in the type of meling equipment conventionally used for the manufacture of chromium trioxide, but the invention readily gives such high purity that this is generally unnecessary. The fused mass is allowed to stratify so that pure chromium trioxide is obtained as the lower layer and the product is flaked. Compared to the crude chromium trioxide which is normally melted this way, purified crystals made according to the present invention have the advantage of liberating much less bisulphate slag and this makes it possible to achieve higher rates of production of fused chromium trioxide. Crystals from which substantially all bisulphate impurity has been removed, containing for example 0.1% or less of total sulphate expressed as $NaHSO_4$, are particularly suitable for treatment in either batch or continuous melting equipment since in this case a pure product is obtainable without the need for slag separation. Consequently the residence time of fused material in the melter can be reduced thereby lessening thermal decomposition of the chromium trioxide.

Thermal decomposition of $CrO_3$ results in the formation of trivalent chromium compounds, which are insoluble when the flaked product is dissolved in water, but which can be minimised by very careful design of the melting apparatus and its operating parameters. For instance very precise temperature control is required to avoid overheating and the residence time in the fused state must be kept to an absolute minimum. Such precise control is not required by the invention when fusion is not involved. Whereas insoluble contents of 0.01% in fused flake $CrO_3$ are possible under very closely controlled conditions insoluble contents of below 0.01%, for instance below 0.007 and even below 0.001%, are easily possible in crystalline $CrO_3$ purified by the process of the invention.

The following examples illustrate the present invention.

EXAMPLE 1

A slurry of crude chromium trioxide crystals is prepared by adding 95% sulphuric acid to an aqueous solution containing 83% by weight of sodium dichromate dihydrate, the acid:dichromate ratio being 2.2:1. The crystals are isolated from the slurry at a temperature of 60° to 65° C. by spinning for 2 minutes in a centrifuge having a 400 mm diameter basket rotating at 2400 rpm. The centrifuged cake contains 3.6% water and 6.7% total sulphate expressed as $NaHSO_4$.

The centrifuged cake (12.6 kg) is washed in the centrifuge by spraying with 6.25 kg of a concentrated solution of pure chromium trioxide (containing 59.5 g $CrO_3$ in every 100 g of solution and obtained by dissolving product from a previous batch) at 65° C. over a period of 1 minute and the wash liquor is removed by spinning for a further two minutes. The washed chromium trioxide crystals (13.0 kg) contain 97.3% $CrO_3$, 2.4% $H_2O$, and 0.05% total sulphate expressed as $NaHSO_4$. The washings contain virtually all the bisulphate and sulphuric acid initially present in the unwashed crystals but only 59.7% of the $CrO_3$ initially present in the wash liquor. The remainder has precipitated onto the cake of washed chromium trioxide crystals to give an apparent yield of 113.5% based on the impure product.

EXAMPLE 2

A centrifuged cake of impure chromium trioxide crystals is prepared according to the method described in Example 1.

The centrifuged cake (13.6 kg) is washed in the centrifuge by spraying over a period of 30 seconds with 1.89 kg of a solution of pure chromium trioxide (containing 31.8 g $CrO_3$ in every 100 g of solution) at 65° C. and the wash liquor is removed by spinning for a further two minutes. The washed chromium trioxide crystals (12.0 kg) contain 96.1% $CrO_3$, 2.7% $H_2O$, and 0.6% total sulphate expressed as $NaHSO_4$. The washings contain 4.3% of the $CrO_3$ initially present in the unwashed crystals and 95.2% of the bisulphate and sulphuric acid.

EXAMPLE 3

A centrifuged cake of impure chromium trioxide crystals is prepared according to the method described in Example 1.

The centrifuged cake (12.9 kg) is washed in the centrifuge by being sprayed with 900 ml water at 65° C. and the wash liquor is removed by spinning for a further two minutes. The washed chromium trioxide crystals (11.1 kg) contain 95.9% $CrO_3$, 2.4% $H_2O$, and 1.3% total sulphate expressed as $NaHSO_4$. The washings contain 6.7% of $CrO_3$ and 85.4% of the bisulphate and sulphuric acid initially present in the unwashed cake.

EXAMPLE 4

A slurry of crude chromium trioxide crystals is prepared by adding 95% sulphuric acid to an aqueous solution containing 83% by weight of sodium dichromate dihydrate, the acid:dichromate ratio being 2.3:1. The crystals are isolated from the slurry at a temperature of 60° to 65° C. by spinning for two minutes in a centrifuge having a 230 mm diameter basket rotating at 1950 rpm. The centrifuged cake contain 4.3% $H_2O$ and 8.0% total sulphate expressed as $NaHSO_4$.

The centrifuged cake (4.1 kg) is washed in the centrifuge by being sprayed with 565 ml water at 65° C. and the wash liquor is removed by spinning for a further five minutes. The washed chromium trioxide crystals (2.7 kg) contain 97.6% $CrO_3$, 2.2% $H_2O$, and less than 0.1% total sulphate expressed as $NaHSO_4$ while the wash liquor contains 25% of the $CrO_3$ and virtually all the bisulphate and sulphuric acid initially present in the unwashed cake. The collected crystals are sprayed with water to 6% moisture, pelletised by compaction and dried at 105° C to give a product containing over 99.8% $CrO_3$.

EXAMPLE 5

The process of Example 1 is repeated except that the molar ratio in the initial reaction is changed from 2.2:1 up to 2.6:1. The purified product analysis and the process conditions are substantially unchanged but the overall yield of purified product based on sodium dichromate is increased from about 62% to about 74%.

EXAMPLE 6

A slurry of crude chromium trioxide crystals, made as described in Example 1, is filtered on a rotary vacuum filter. 100 parts by weight of the filter cake, containing 74.4% $CrO_3$, 7.2% $H_2O$ and 18.2% total sulphate expressed as $NaHSO_4$, are reslurried in 10 parts by weight of water at 65° C. and the slurry then centrifuged at 65° C. for two minutes. Chromium trioxide crystals (62 parts by weight) are obtained containing 95.5% $CrO_3$, 1.9% $H_2O$, and 1.9% total sulphate expressed as $NaHSO_4$.

EXAMPLE 7

A slurry containing impure chromium trioxide crystals is prepared according to the method described in Example 1.

It is filtered by centrifuging in a centrifuge having a cylindrical titanium basket covered with a P.T.F.E. cloth. The basket diameter is about 400 mm and its length 200 mm. A spray pipe extends along the length of the basket close to the cloth. The pipe has holes drilled through it at about 13 cm centres along most of its length and is reciprocated during spraying along its length with an amplitude of from 10 to 25 mm.

The centrifuged cake (13.6 kg) is washed in the centrifuge by spraying over a period of 30 seconds with 4.0 kg of a solution (at 65° C.) containing 61 g $CrO_3$ and 3.0 g total sulphate (expressed as $NaHSO_4$) in each 100 g.

After spinning for a further 30 seconds the washed crystals are then further purified by being sprayed over a 30 second period with 4.0 kg of a solution containing 60 g $CrO_3$ in each 100 g, at 65° C. The wash liquor is removed by spinning for a further two minutes to leave a washed chromium trioxide product (13.1 kg) containing 97.3% $CrO_3$, 2.4% $H_2O$ and less than 0.1% total sulphate (expressed as $NaHSO_4$).

The apparent yield of chromium trioxide is 106%. The washings from the first washing stage are recycled to acidify chromate containing liquors obtained from the processing of chromite ore whilst those from the second stage are retained for use as the wash liquor in the first washing stage on the next batch.

We claim:

1. A process in which a purified product containing more than 95% chromium trioxide and less than 3% total sulphate, expressed as sodium bisulphate, is obtained from a crude crystalline product made by reacting concentrated aqueous sodium dichromate with sulphuric acid and separating the resultant crystalline crude product from the reaction liquor, the process comprising washing the crude crystalline product with a purifying wash liquor selected from the group consisting of water and an aqueous solution of chromic acid and in which part at least of the washing is conducted by spraying the wash liquor onto the crude product while the product and the liquor are at a temperature above 50° C. and below the fusion temperature while centrifuging and wherein centrifuging is continued until the water content is less than 3%.

2. A process according to claim 1 in which the crude crystalline product is made by reacting concentrated aqueous sodium dichromate with sulphuric acid and thereby forming a warm reaction liquor containing crude crystalline product, maintaining the reaction liquor at a temperature above 50° C., separating the crude crystalline product while at a temperature above 50° C. by centrifuging down to a water content of 2 to 5% and spraying the crude product while at a temperature above 50° C. with the wash liquor while centrifuging and centrifuging is continued until the water content is less than 3%.

3. A process according to claim 1 in which the wash liquor is substantially saturated aqueous chromic acid solution.

4. A process according to claim 3 in which the wash liquor contains below 30% sulphate, measured as $NaHSO_4$.

5. A process according to claim 4 conducted as a cyclic process in which washing is conducted in two stages, with the wash liquor for the second stage being water or freshy made chromic acid solution and the wash liquor for the first stage being wash liquor that has been recycled after use as wash liquor in a previous second stage washing.

6. A process according to claim 1 in which the amount of wash liquor is not more than 70% by weight of crude product.

7. A process according to claim 1 in which the centrifuge is cylindrical and spraying is effected from a spray pipe carrying a plurality of orifices along its length and that reciprocates within the centrifuge parallel to the axis of the centrifuge.

8. A process according to claim 1 in which spraying is conducted for 15 seconds to 2 minutes and then centrifuging is continued for 30 seconds to 5 minutes.

9. A process according to claim 1 in which the molar ratio sodium dichromate:sulphuric acid is 1:2.4 to 1:2.8.

10. A process according to claim 1 in which the crude product contains 60 to 90% $CrO_3$ and 6 to 30% sulphate expressed as $NaHSO_4$ and the purified product contains more than 97% $CrO_3$ and below 1% sulphate expressed as $NaHSO_4$.

* * * * *